US011227704B2

(12) United States Patent
Komori et al.

(10) Patent No.: US 11,227,704 B2
(45) Date of Patent: Jan. 18, 2022

(54) MULTICORE CABLE WATERPROOFING STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hirokazu Komori, Mie (JP); Takahiro Murata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/267,076

(22) PCT Filed: Aug. 1, 2019

(86) PCT No.: PCT/JP2019/030175
§ 371 (c)(1),
(2) Date: Feb. 9, 2021

(87) PCT Pub. No.: WO2020/039876
PCT Pub. Date: Feb. 27, 2020

(65) Prior Publication Data
US 2021/0313093 A1 Oct. 7, 2021

(30) Foreign Application Priority Data
Aug. 21, 2018 (JP) .............................. JP2018-154453

(51) Int. Cl.
H01B 7/282 (2006.01)
H01B 7/00 (2006.01)

(52) U.S. Cl.
CPC ........... H01B 7/282 (2013.01); H01B 7/0009 (2013.01)

(58) Field of Classification Search
CPC ...... H01B 7/282; H01B 7/009; H01B 13/228; H01B 7/2825; H01B 7/0045; H01R 4/22;
(Continued)

(56) References Cited

U.S. PATENT DOCUMENTS 3,585,275 A * 6/1971 Gillemot .............. H02G 15/043
174/76
4,289,553 A * 9/1981 Nolf ...................... B23P 11/025
156/86
(Continued)

FOREIGN PATENT DOCUMENTS

JP 2012-182924 A 9/2012
JP 2017-139151 A 8/2017
JP 2018-125122 A 8/2018

OTHER PUBLICATIONS

International Search Report dated Oct. 21, 2019 for WO 2020/039876 A1 (2 pages).

Primary Examiner — William H. Mayo, III
(74) Attorney, Agent, or Firm — Abelman, Frayne & Schwab

(57) ABSTRACT

A waterproof structure of a multicore cable includes: a multicore cable in which a power line and a signal line are surrounded by a sheath; a heat-shrinkable tube having a sheath covering portion that covers the sheath and an electric wire covering portion that is continuous with the sheath covering portion and covers the power line and the signal line led out from a front end of the sheath; a waterproof portion that is disposed in a gap between the electric wire
(Continued)

covering portion and the power line and the signal line to prevent water from entering the gap between the electric wire covering portion and the power line and the signal line; and a protector that holds the heat-shrinkable tube therein and has a stopper located near a front end of the heat-shrinkable tube.

8 Claims, 10 Drawing Sheets

(58) Field of Classification Search
CPC ... H01R 4/70; H01R 4/72; H01R 9/11; H01R 43/005; H02G 15/1806; H02G 15/02
USPC ... 174/74 R, 74 A, 75 F, 77 R, 82, 83, 84 R, 174/87, 94 R, DIG. 8
See application file for complete search history.

(56) References Cited

U.S. PATENT DOCUMENTS

| | | | | |
|---|---|---|---|---|
| 4,504,699 | A | * | 3/1985 | Dones ................. B29C 61/0608 174/76 |
| 5,641,943 | A | * | 6/1997 | Sawamura ............... H01R 4/22 174/74 A |
| 6,359,226 | B1 | * | 3/2002 | Biddell .................... H01R 4/22 174/74 A |
| 7,834,268 | B2 | * | 11/2010 | Ootsuki ............. H02G 15/1806 174/74 R |
| 2006/0180336 | A1 | * | 8/2006 | King, Jr. ................. H01R 4/22 174/87 |
| 2014/0284099 | A1 | * | 9/2014 | Saito ...................... H01B 7/282 174/70 R |
| 2017/0200536 | A1 | * | 7/2017 | Yabe ...................... B32B 27/36 |
| 2018/0048081 | A1 | * | 2/2018 | Komori ................... H01R 9/11 |
| 2018/0218807 | A1 | * | 8/2018 | Takahashi ........... B60R 16/0215 |
| 2019/0280423 | A1 | * | 9/2019 | Hamada ................. H01R 43/24 |
| 2019/0386477 | A1 | * | 12/2019 | Fukuda ................... H01R 4/22 |

* cited by examiner

MULTICORE CABLE WATERPROOFING STRUCTURE

CROSS REFERENCE TO RELATED APPLICATIONS

This application is a national phase of PCT application No. PCT/JP2019/030175, filed on 1 Aug. 2019, which claims priority from Japanese patent application No. 2018-154453, filed on 21 Aug. 2018, all of which are incorporated herein by reference.

TECHNICAL FIELD

The technique disclosed in this specification relates to a waterproof structure of a multicore cable having a plurality of wires.

BACKGROUND

Conventionally, Patent Document 1 describes a known example of a waterproof structure of a multicore cable in which electric wires are surrounded by a sheath. The electric wires are led out from an end of the multicore cable. A heat-shrinkable tube covers a region from outer circumferential surfaces of the electric wires to an outer circumferential surface of the sheath. A hot melt block is melted and then allowed to solidify between the heat-shrinkable tube and the electric wires so as to be held therebetween.

With the above configuration, a portion in which the electric wires branch at an end of the sheath of the multicore cable is waterproofed.

PRIOR ART DOCUMENT

Patent Document

Patent Document 1: JP 2012-182924A

SUMMARY OF THE INVENTION

Problems to be Solved

The heat-shrinkable tube shrinks to a predetermined shape by being heated. Therefore, if the heat-shrinkable tube is not sufficiently heated, the heat-shrinkable tube is reheated due to heat generated by the multicore cable being energized, and as a result, the heat-shrinkable tube may further shrink. In this case, there is a possibility that the heat-shrinkable tube moves from the end of the sheath to the outer circumferential surfaces of the electric wires having a smaller outer diameter dimension as a whole. If the heat-shrinkable tube moves away from the sheath in this way, the hot melt block that has melted and solidified may become exposed, and the waterproof performance of the multicore cable may decrease.

The technique disclosed in this specification has been achieved based on the above circumstances, and an object thereof is to suppress a reduction in the waterproof performance of the multicore cable.

Means to Solve the Problem

The technique disclosed in this specification includes: a multicore cable in which a plurality of electric wires are surrounded by a sheath and the electric wires are led out from an end of the sheath; a heat-shrinkable tube having a sheath covering portion that covers the sheath and an electric wire covering portion that is continuous with the sheath covering portion and covers the electric wires led out from the end of the sheath; a waterproof portion that is disposed in a gap between the electric wire covering portion and the electric wires to prevent water from entering the gap between the electric wire covering portion and the electric wires; and a protector that holds the heat-shrinkable tube therein and has a stopper located near an end on the electric wire covering portion side of the heat-shrinkable tube. In the heat-shrinkable tube, a length dimension L1 of the sheath covering portion is set larger than a distance L2 between the end on the electric wire covering portion side of the heat-shrinkable tube and the stopper.

According to the above configuration, the heat-shrinkable tube is supported by the stopper even when the heat-shrinkable tube attempts to move away from the sheath by receiving heat and shrinking. By the time the end on the electric wire covering portion side of the heat-shrinkable tube comes into contact with the stopper, the heat-shrinkable tube moves by the distance L2 between the end on the electric wire covering portion side and the stopper. Since the length dimension L1 of the sheath covering portion is set larger than the above-mentioned distance L2, at least a part of the sheath covering portion is maintained so as to cover the sheath while the end on the electric wire covering portion side of the heat-shrinkable tube is supported by the stopper. Thus, the case where heat-shrinkable tube comes off from the end of the sheath is suppressed, thereby suppressing the case where the waterproof portion that is disposed between the electric wire covering portion and the electric wires becomes exposed. As a result, it is possible to suppress a reduction in the waterproof performance of the multicore cable.

The following embodiments are preferable as embodiments of the technique disclosed in this specification.

The stopper is located in front of the end on the electric wire covering portion side of the heat-shrinkable tube in a direction from the sheath covering portion to the electric wire covering portion.

According to the above configuration, when the heat-shrinkable tube is about to move away from the sheath, that is, in the direction from the sheath covering portion to the electric wire covering portion, the heat-shrinkable tube is reliably prevented from coming off by the stopper. Thus, it is possible to reliably suppress a reduction in the waterproof performance of the multicore cable.

The protector has a sheath holder configured to hold the sheath.

According to the above configuration, the sheath holder of the protector holds the sheath, so that the sheath and the protector are relatively positioned to each other. Thus, since the sheath and the stopper of the protector are relatively positioned to each other, when the end on the electric wire covering portion side of the heat-shrinkable tube is supported by the stopper, the stopper can be disposed so that the sheath holder reliably covers the outer circumferential surface of the sheath. As a result, it is possible to reliably suppress a reduction in the waterproof performance of the multicore cable.

The electric wires led out from the sheath are surrounded by an exterior member different from the sheath, and the protector has an exterior member holder configured to hold the exterior member.

According to the above configuration, the exterior member holder of the protector holds the exterior member, so that the protector can cover the heat-shrinkable tube and the electric wires exposed from the heat-shrinkable tube in a region between the heat-shrinkable tube and the exterior member. Thus, the protector can protect the heat-shrinkable tube and the electric wires from collision with foreign objects, so that it is possible to further suppress a reduction in the waterproof performance of the multicore cable.

The stopper is provided at a position corresponding to a diameter portion of the end of the electric wire covering portion.

According to the above configuration, the stopper can come into contact with the region corresponding to the diameter portion of the end of the electric wire covering portion, so that the heat shrinkable tube can be reliably prevented from coming off. Thus, it is possible to reliably suppress a reduction in the waterproof performance of the multicore cable.

The protector has an electric wire guide portion that is in contact with at least one of the electric wires and guides the at least one electric wire.

According to the above configuration, since the electric wires arranged inside the protector are guided by the electric wire guide portion, the case where the their arrangement in the protector shifts due to vibration is suppressed. Thus, it is possible to suppress the shifting of the relative positions of the electric wires and the waterproof portion, so that it is possible to further suppress a reduction in the waterproof performance of the multicore cable.

The electric wire guide portion and the stopper are integrally formed.

According to the above configuration, a structure of the protector can be simplified as compared with a case where the electric wire guide portion and the stopper are separate members.

The waterproof portion includes a hot melt resin.

According to the above configuration, a heating step for melting the hot melt resin and a heating step for shrinking the heat-shrinkable tube can be performed in the same step, so that it is possible to increase the efficiency of the task for waterproofing the multicore cable.

Effect of the Invention

According to the technique disclosed in this specification, it is possible to suppress a reduction in the waterproof performance of the multicore cable.

DETAILED DESCRIPTION TO EXECUTE THE INVENTION

Embodiment 1

Figure 1:
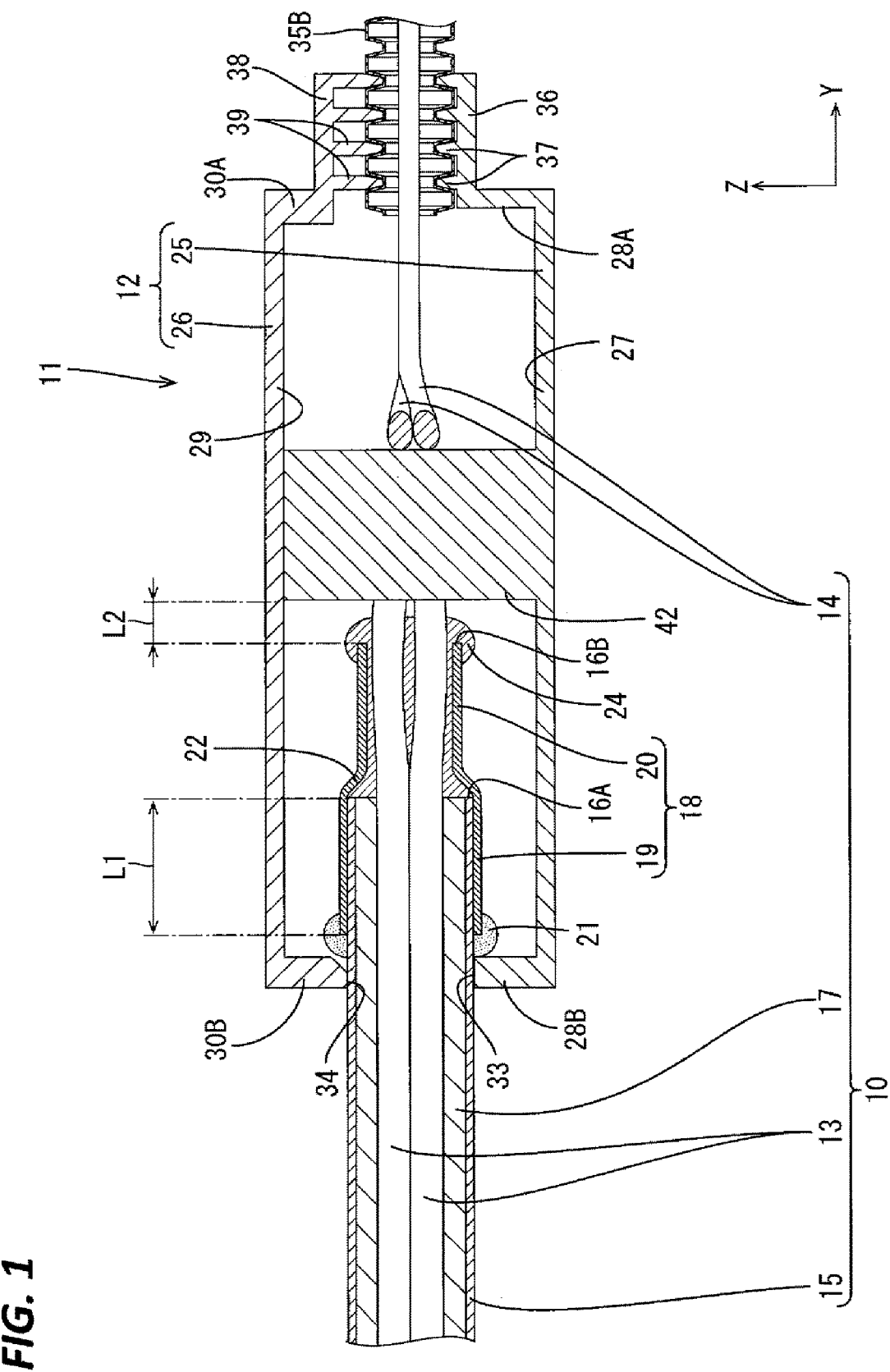
FIG. 1 is a cross-sectional view taken along a line I-I in FIG. 2 illustrating a waterproof structure of a multicore cable according to Embodiment 1.
Figure 2:
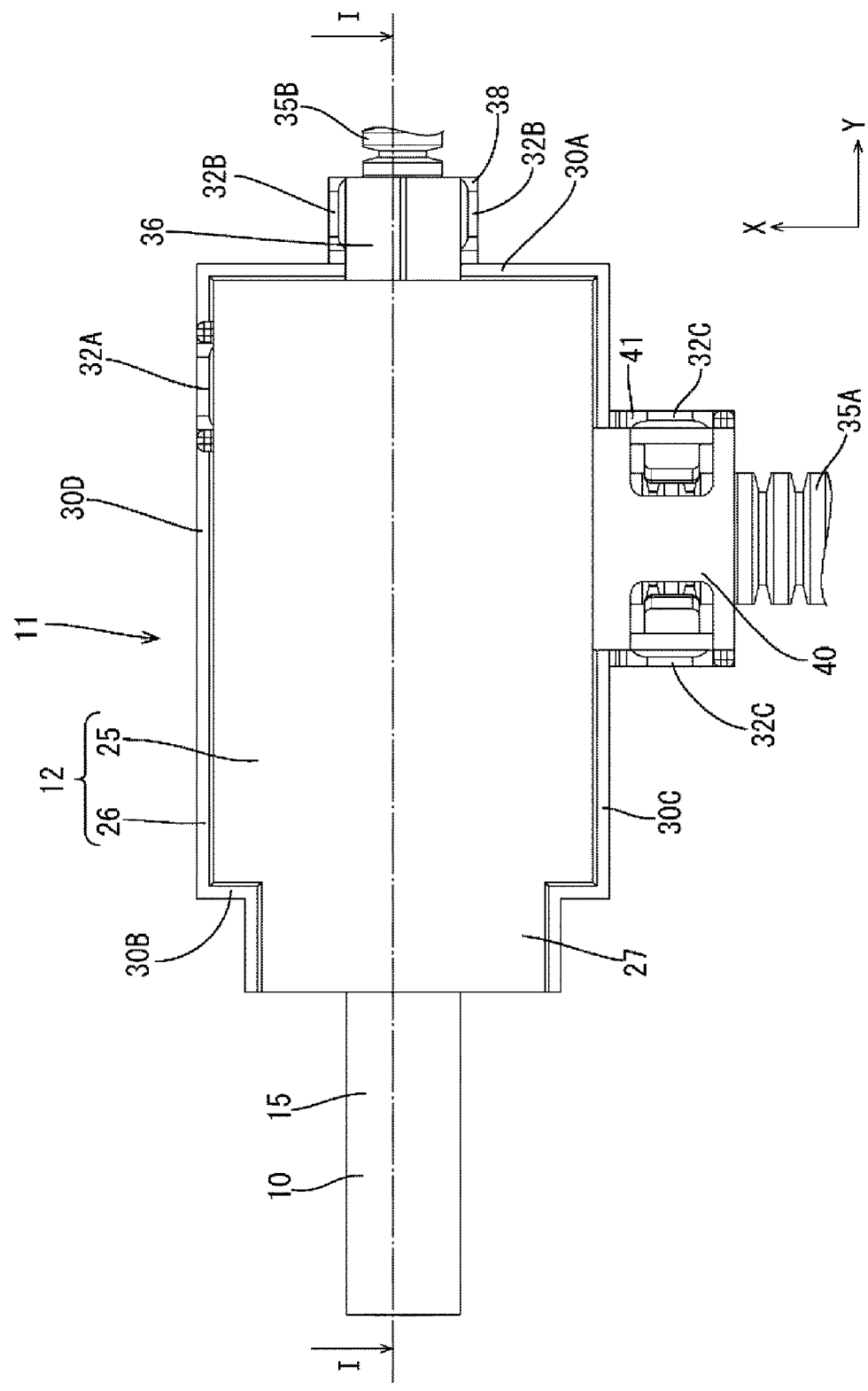
FIG. 2 is a bottom view illustrating the waterproof structure of the multicore cable.

Embodiment 1 of a technique disclosed in this specification will be described with reference to FIGS. 1 to 8. A waterproof structure 11 of a multicore cable 10 according to the present embodiment includes the multicore cable 10 and a protector 12. The waterproof structure 11 of the multicore cable 10 according to the present embodiment is provided at a portion such as a tire house or an engine room where water may splash on the multicore cable 10 in a vehicle (not shown). In the following description, the Z direction is an upper direction, the Y direction is a front direction, and the X direction is a left direction. Note that when there are a plurality of members that are the same, a reference numeral may be given only to some of the members, and the reference numeral may be omitted for other members.

Multicore Cable 10

Figure 3:
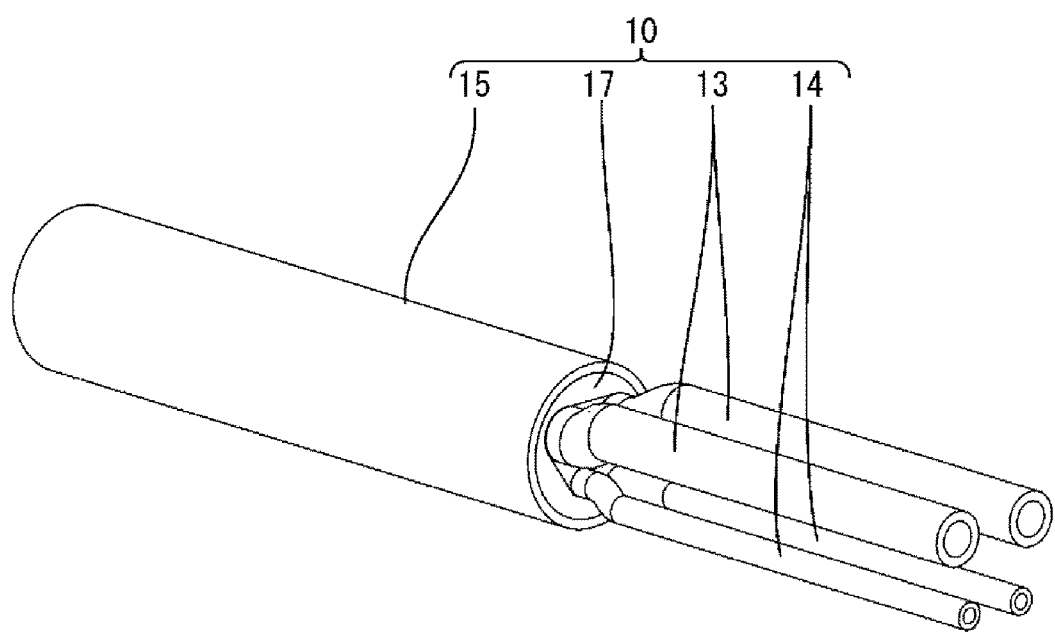
FIG. 3 is a perspective view illustrating the multicore cable in a state where a front end of a sheath has been peeled off.

As illustrated in FIG. 3, the multicore cable 10 includes a plurality of (two in the present embodiment) power lines 13 (an example of electric wires) and a plurality of (two in the present embodiment) signal lines 14 (an example of electric wires), and outer circumferential surfaces of the power lines 13 and the signal lines 14 are collectively surrounded by a sheath 15 made of an insulating synthetic resin. The sheath 15 has a hollow cylindrical shape. The power lines 13 and the signal lines 14 are led out forward from a front end 16A of the sheath 15. Cross-sectional shapes of the power lines 13 and the signal lines 14 are substantially circular. A diameter dimension of the power lines 13 is set larger than that of the signal lines 14.

A filling material 17 is disposed between an inner surface of the sheath 15 and the power lines 13 and the signal lines 14. As the filling material 17, any material such as a synthetic resin, a synthetic fiber, and a natural fiber can be appropriately selected.

Heat-Shrinkable Tube 18

As illustrated in FIG. 1, a heat-shrinkable tube 18 covers a region of the sheath 15 near the front end 16A thereof and a region of the power lines 13 and the signal lines 14, which have been led out forward from the front end 16A of the sheath 15, that is near the front end 16A of the sheath 15. The heat-shrinkable tube 18 is made of a synthetic resin and has a hollow tubular shape. The heat-shrinkable tube 18 shrinks when heated to a predetermined temperature. As the synthetic resin forming the heat-shrinkable tube 18, for example, any synthetic resin such as a crosslinked polyolefin resin can be appropriately selected.

Figure 4:
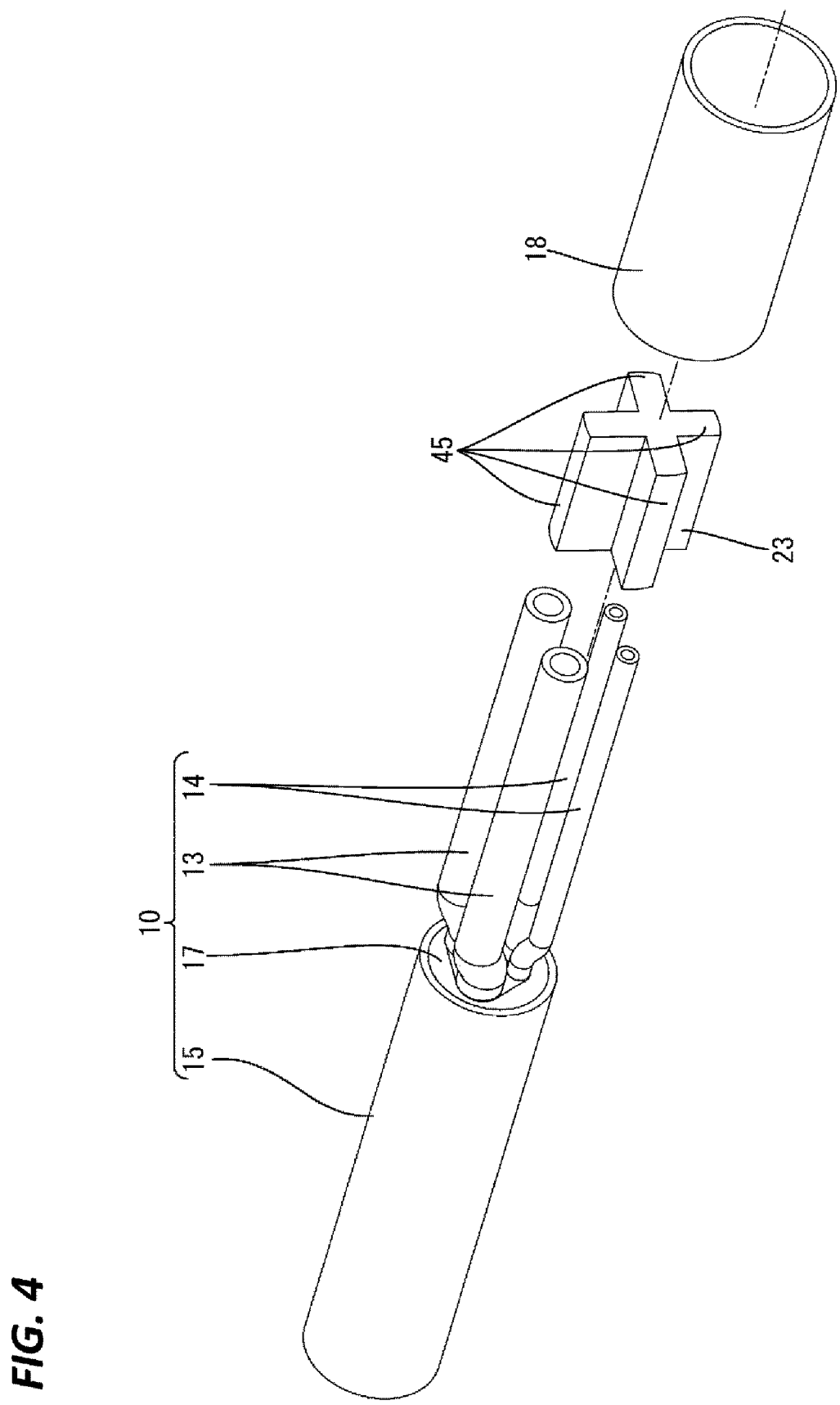
FIG. 4 is a perspective view illustrating a step of attaching a water-stopping block and a heat-shrinkable tube to a peeled multicore cable.

As illustrated in FIG. 4, the heat-shrinkable tube 18 has a hollow cylindrical shape before being heated to the predetermined temperature. An adhesive is applied to an inner surface of the heat-shrinkable tube 18 according to the present embodiment. The adhesive melts when heated to the predetermined temperature and solidifies at room temperature. Note that the adhesive may not be applied to the inner surface of the heat-shrinkable tube 18.

Figure 6:
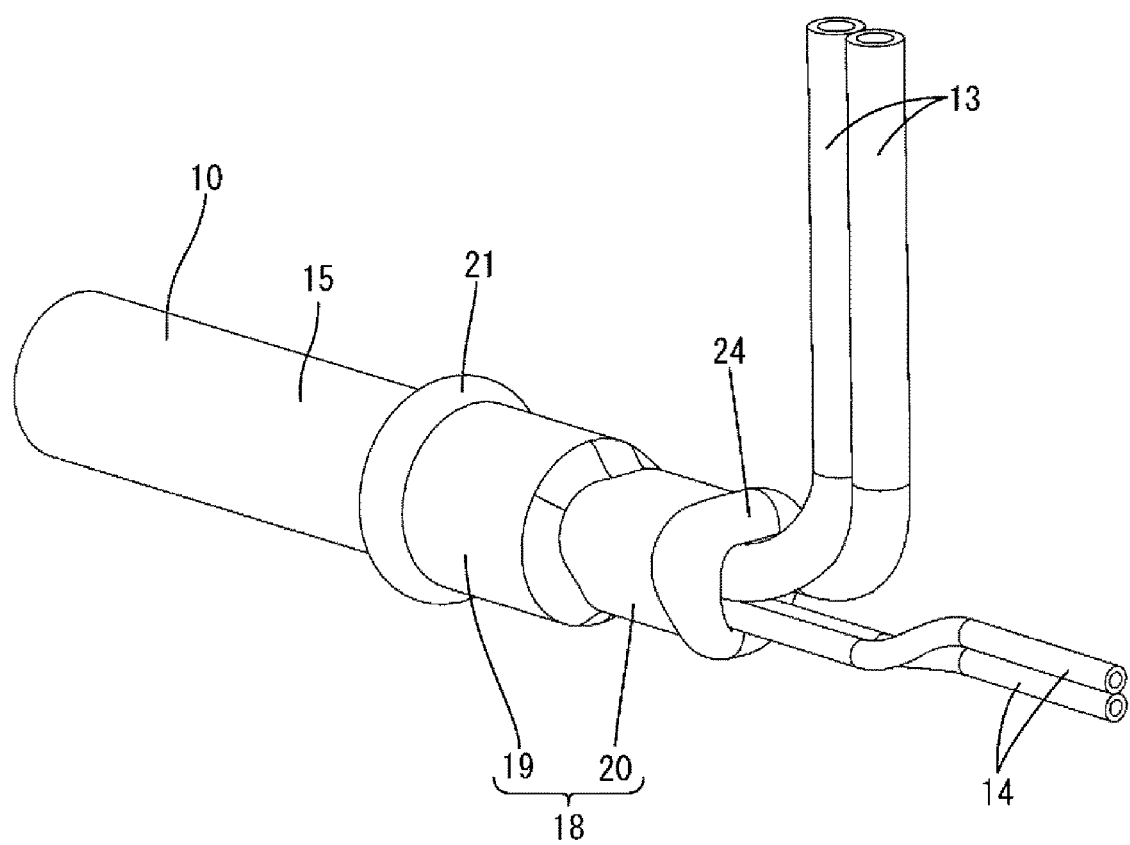
FIG. 6 is a perspective view illustrating the multicore cable after heating.

FIG. 6 illustrates the shape of the heat-shrinkable tube 18 after being heated to the predetermined temperature. The heat-shrinkable tube 18 has a sheath covering portion 19 that covers an outer surface of the sheath 15, and an electric wire covering portion 20 that is continuous with the front of the sheath covering portion 19 and covers the power lines 13 and the signal lines 14 that extend forward from the front end 16A of the sheath 15. In other words, a rear portion of the heat-shrinkable tube 18 is the sheath covering portion 19, and a front portion of the heat-shrinkable tube 18 is the electric wire covering portion 20. An outer diameter of the sheath covering portion 19 is larger than that of the electric wire covering portion 20.

As illustrated in FIG. 1, a rear leakage portion 21 is formed at a rear end of the sheath covering portion 19 due to the melted adhesive leaking out rearward from the rear end of the sheath covering portion 19 and then solidifying. The rear leakage portion 21 leaks out rearward from the rear end of the sheath covering portion 19 and is formed to cover the rear end of the sheath covering portion 19 from radially outward of the sheath covering portion 19. The rear leakage portion 21 suppresses the case where water enters a gap between the rear end of the sheath covering portion 19 and the sheath 15. Further, although not shown in detail, the adhesive that has melted and then solidified is located between an inner surface of the sheath covering portion 19 and the outer surface of the sheath 15, and the adhesive prevents water from entering the gap between the sheath covering portion 19 and the sheath 15.

A waterproof portion 22 is disposed between the electric wire covering portion 20 and the power lines 13 and the signal lines 14. The waterproof portion 22 is disposed to fill a gap between an inner surface of the electric wire covering portion 20 and outer surfaces of the power lines 13 and outer surfaces of the signal lines 14, so that water is prevented from entering the gap between the electric wire covering portion 20 and the power lines 13 and the signal lines 14.

The waterproof portion 22 is formed due to the adhesive applied to the inner surface of the electric wire covering portion 20 and a water-stopping block 23, which will be described below, melting and mixing, and then solidifying. The synthetic resin constituting the water-stopping block 23 and the synthetic resin constituting the adhesive may be the same or different.

A front leakage portion 24 is formed at the front end 16B of the electric wire covering portion 20, due to the melted adhesive and the melted water-stopping block 23 mixing and leaking out forward from the front end 16B of the electric wire covering portion 20 and then solidifying. The front leakage portion 24 leaks out forward from the front end 16B of the electric wire covering portion 20, and is formed to cover the front end 16B of the electric wire covering portion 20 from radially outward of the electric wire covering portion 20. The front leakage portion 24 suppresses the case where water enters the gap between the front end 16B of the electric wire covering portion 20 and the sheath 15.

Protector 12

As illustrated in FIG. 1, at least the heat-shrinkable tube 18 is held inside a box-like protector 12 made of synthetic resin. The protector 12 has a lower case 25 that opens upward and is located on a lower side, and an upper case 26 that is integrally assembled with the lower case 25 so as to close an opening of the lower case 25 from above.

Figure 7:
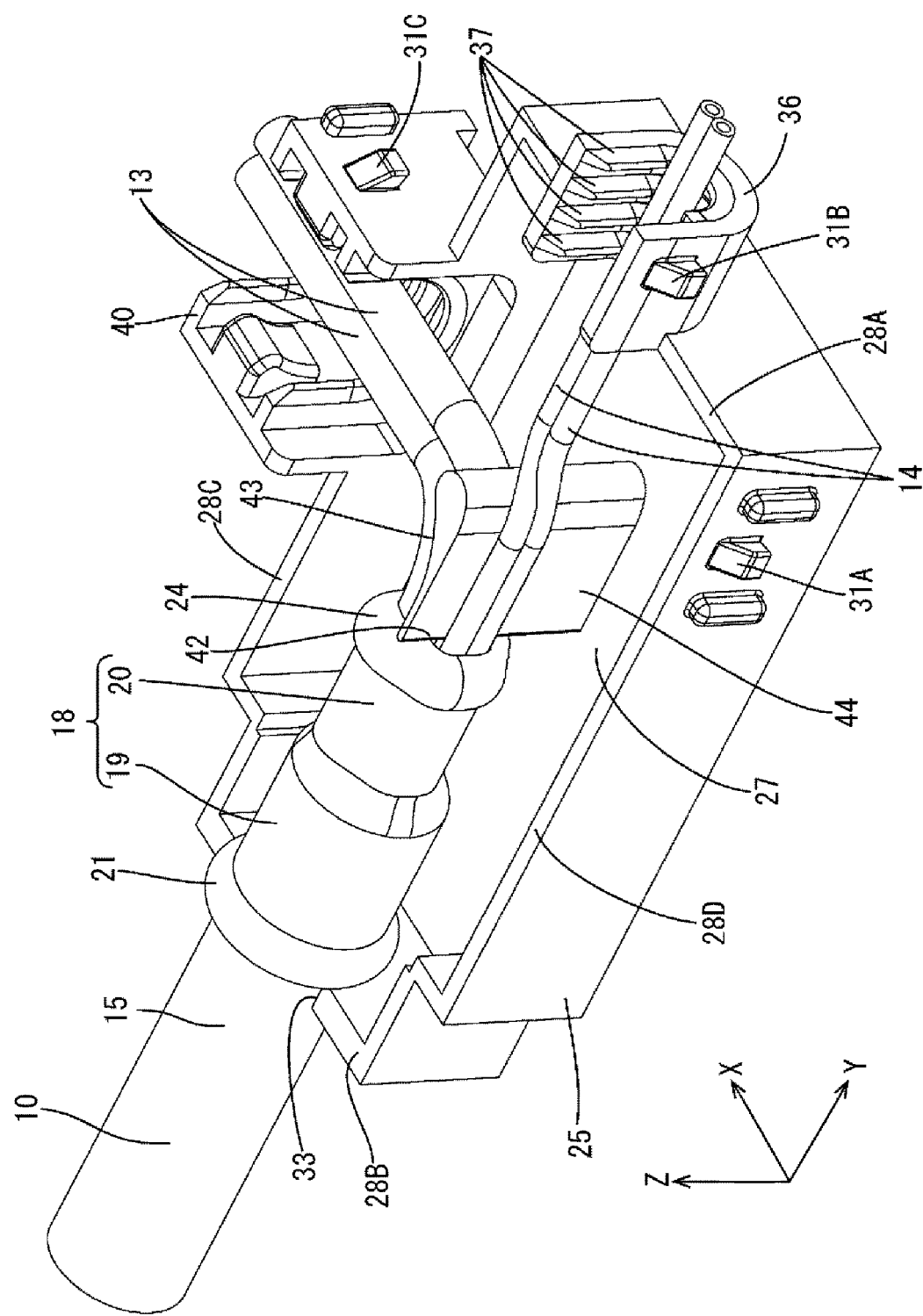
FIG. 7 is a perspective view illustrating a state in which the multicore cable is disposed in a lower case.

As illustrated in FIG. 7, the lower case 25 has a substantially rectangular bottom wall 27 extending in a front-rear direction and four side walls 28A, 28B, 28C and 28D extending upward from side edges of the bottom wall 27. The upper case 26 has a substantially rectangular upper wall 29 extending in the front-rear direction (see FIG. 1), and side walls 30A, 30B, 30C and 30D extending downward from side edges of the upper wall 29 (see FIG. 2). The shape of the upper wall 29 of the upper case 26 corresponds to the shape of the bottom wall 27 of the lower case 25. Note that corrugated tubes 35A and 35B, which will be described below, are not shown in FIG. 7.

As illustrated in FIG. 7, a lower sheath holder 33 recessed in a shape following the outer shape of the sheath 15 is formed in the side wall 28B located on the rear side of the lower case 25. The lower sheath holder 33 is recessed in a substantially semicircular shape. An upper sheath holder 34 recessed in a shape following the outer shape of the sheath 15 is formed in the side wall 30B located on the rear side of the upper case 26. The upper sheath holder 34 is recessed in a substantially semicircular shape.

When the lower case 25 and the upper case 26 are integrally assembled, the sheath 15 of the multicore cable 10 is held by being sandwiched between the lower sheath holder 33 and the upper sheath holder 34 from above and below. Specifically, the lower sheath holder 33 and the upper sheath holder 34 hold the sheath 15 at a position that is behind the rear end of the sheath covering portion 19 covering the outer circumferential surface of the sheath 15, and that is behind the rear leakage portion 21. Thus, the sheath 15 and the protector 12 do not move relatively to each other.

As illustrated in FIG. 7, the power lines 13 led out forward from the front end 16B of the electric wire covering portion 20 are bent to the left and routed. On the other hand, the signal lines 14 led out forward from the front end 16B of the electric wire covering portion 20 extend forward and are routed. As described above, inside the protector 12, the power lines 13 and the signal lines 14 are led out forward from the front end 16B of the electric wire covering portion 20 and then respectively branched.

The power lines 13 branched from the front end 16A of the sheath 15 are surrounded by the corrugated tube 35A (an example of an exterior member), and the signal lines 14 branched from the front end 16A of the sheath 15 are surrounded by the corrugated tube 35B (an example of the exterior member). Thus, the power lines 13 and the signal lines 14 are protected from collision with foreign objects. The corrugated tubes 35A and 35B are made of an insulating synthetic resin and have a bellows-like hollow tubular shape.

A lower corrugated tube holder 36 (an example of an exterior member holder) that projects forward is formed on the side wall 28A on the front side of the lower case 25. The lower corrugated tube holder 36 is formed in a groove shape that has a substantially U-shaped cross-section and opens upward. The lower corrugated tube holder 36 is formed with a plurality of lower holding ribs 37 that project upward and are arranged at intervals in the front-rear direction. An upper corrugated tube holder 38 (an example of the exterior member holder) that projects forward is formed on the side wall 30A on the front side of the upper case 26. The upper corrugated tube holder 38 is formed in a groove shape that has a substantially U-shaped cross-section and opens downward. The upper corrugated tube holder 38 is formed with a plurality of upper holding ribs 39 that project downward and are arranged at intervals in the front-rear direction.

As illustrated in FIG. 1, in a state in which the lower case 25 and the upper case 26 are integrally assembled, the corrugated tube 35B surrounding the signal lines 14 is held by being sandwiched between the lower corrugated tube holder 36 and the upper corrugated tube holder 38 from above and below. Specifically, the lower holding ribs 37 of the lower corrugated tube holder 36 fit into the bellows shape of the corrugated tube 35B from below, and the upper holding ribs 39 of the upper corrugated tube holder 38 fit thereinto from above, so that the corrugated tube 35B is held by the protector 12.

The left side wall 28C among the side walls of the lower case 25 is provided with a lower corrugated tube holder 40 (an example of the exterior member holder) for holding the corrugated tube 35A that surrounds the power lines 13. The left side wall 30C of the upper case 26 is provided with an upper corrugated tube holder 41 (an example of the exterior member holder) for holding the corrugated tube 35A that surrounds the power lines 13. When the lower case 25 and the upper case 26 are integrally assembled, the corrugated tube 35A surrounding the power lines 13 is held by being sandwiched between the lower corrugated tube holder 40 and the upper corrugated tube holder 41 from above and below.

A locking portion 31A that projects outward is formed on an outer surface of the side wall 28D located on the right side of the lower case 25. A lock receiver 32A that elastically engages with the locking portion 31A is formed at a position corresponding to the locking portion 31A on the side wall 30D of the upper case 26.

A locking portion 31B that projects outward is formed on an outer surface of the lower corrugated tube holder 36. A lock receiver 32B that elastically engages with the locking portion 31B is formed at a position corresponding to the locking portion 31B on the upper corrugated tube holder 38.

A locking portion 31C that projects outward is formed on an outer surface of the lower corrugated tube holder 40. A lock receiver 32C that elastically engages with the locking portion 31C is formed at a position corresponding to the locking portion 31C on the upper corrugated tube holder 41.

The locking portion 31A and the lock receiver 32A elastically engage with each other, the locking portion 31B and the lock receiver 32B elastically engage with each other, and the locking portion 31C and the lock receiver 32C elastically engage with each other, and thus the lower case 25 and the upper case 26 can be integrally assembled.

Stopper 42

As illustrated in FIG. 1, a stopper 42 that projects upward is formed on the bottom wall 27 of the lower case 25. The stopper 42 is provided near the front end 16B of the electric wire covering portion 20 in a state in which the lower case 25 and the upper case 26 are integrally assembled and the sheath 15 is held by the lower sheath holder 33 and the upper sheath holder 34. In the present embodiment, the stopper 42 is provided at a position that is in front of the front end 16B of the electric wire covering portion 20 in a direction from the sheath covering portion 19 to the electric wire covering portion 20, and that is separated forward from the front leakage portion 24.

As illustrated in FIG. 7, the stopper 42 is provided at a position corresponding to a diameter portion of the front end 16B of the electric wire covering portion 20 on the sheath 15 in an up-down direction. A height dimension of the stopper 42 in the up-down direction is set larger than a diameter dimension of the electric wire covering portion 20. As illustrated in FIG. 1, in the present embodiment, in a state in which the lower case 25 and the upper case 26 are integrally assembled, an upper end of the stopper 42 is in contact with the upper wall 29 of the upper case 26 from below.

As illustrated in FIG. 7, the stopper 42 has a substantially tear-like shape having a front portion that is wider than a rear portion as seen from above. A left side surface of the stopper 42 is formed in a concave shape, and serves as a power line guide portion 43 (an example of an electric wire guide portion) that comes into contact with the power lines 13 and guides the power lines 13 to the left. Further, a right side surface of the stopper 42 is formed substantially linear, and serves as a signal line guide portion 44 (an example of the electric wire guide portion) that comes into contact with the signal lines 14 and guides the signal lines 14 forward. As described above, in the present embodiment, the stopper 42, the power line guide portion 43, and the signal line guide portion 44 are integrally formed.

As illustrated in FIG. 7, a length dimension L1 of the sheath covering portion 19 is set larger than a distance L2 between the front end 16B of the electric wire covering portion 20 and the stopper 42 in the front-rear direction.

Method of Waterproofing Multicore Cable 10

Next, a method of waterproofing the multicore cable 10 will be described. The method of waterproofing the multicore cable 10 is not limited to the following description.

As illustrated in FIG. 3, the power lines 13 and the signal lines 14 are exposed by peeling the sheath 15 of the multicore cable 10 by a predetermined length dimension.

As illustrated in FIG. 4, the water-stopping block 23 is attached to the power lines 13 and the signal line 14 exposed from the sheath 15. The water-stopping block 23 is made of four locking walls 45 formed in a radial cross-section (in the present embodiment, a cross-shaped cross-section branched at 90-degree central angles). The power lines 13 and the signal lines 14 are respectively arranged in four spaces partitioned by the four locking walls 45. Thus, the locking walls 45 are respectively arranged between the power lines 13 and the signal lines 14.

Figure 5:
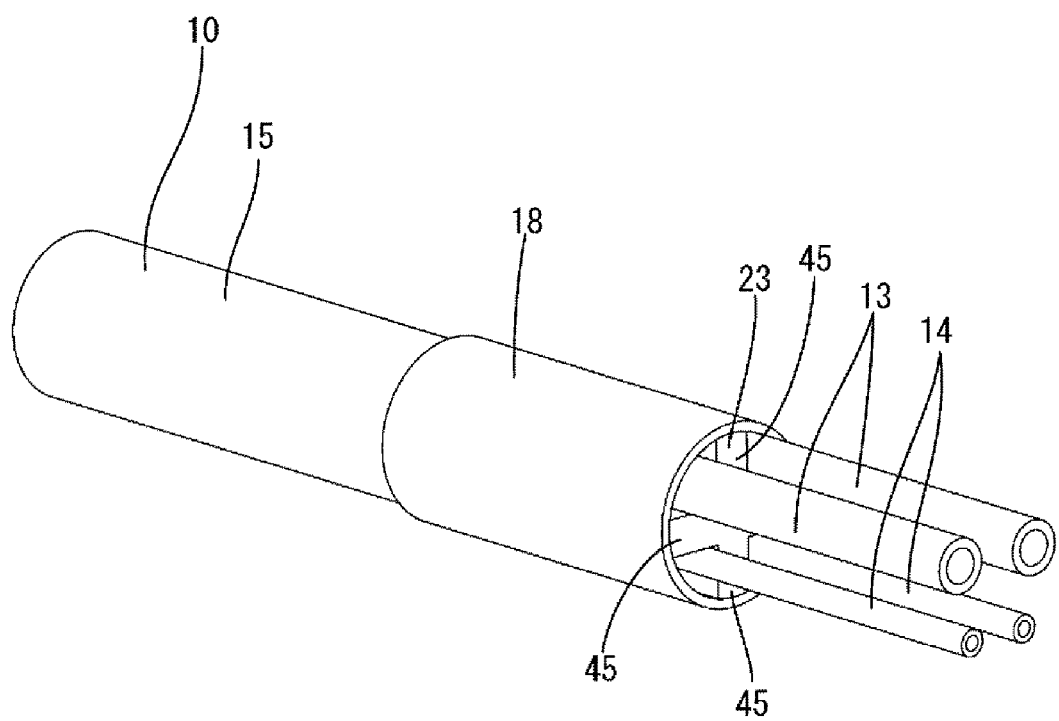
FIG. 5 is a perspective view illustrating a state in which the water-stopping block and the heat-shrinkable tube have been attached to the peeled multicore cable.

As illustrated in FIG. 5, when the water-stopping block 23 has been attached to the power lines 13 and the signal lines 14, the heat-shrinkable tube 18 covers a region from a region near the front end 16A of the sheath 15 to a region of the power lines 13 and the signal lines 14.

Heat treatment is performed by a known heating method. When the water-stopping block 23 is heated to a predetermined temperature or higher in the heat treatment, the melted water-stopping block 23 fills the space between the power lines 13 and the signal lines 14. Further, the adhesive applied to the inner surface of the heat-shrinkable tube 18 melts so as to fill the space between the heat-shrinkable tube 18 and the sheath 15, and fill the space between the heat-shrinkable tube 18 and the power lines 13 and the signal lines 14. The melted water-stopping block 23 and the melted adhesive mix inside the electric wire covering portion 20 of the heat-shrinkable tube 18.

In the above heat treatment, the heat-shrinkable tube 18 shrinks when the heat-shrinkable tube 18 is heated to the predetermined temperature or higher. The melted adhesive leaks out from the rear end of the sheath covering portion 19 and solidifies to form the rear leakage portion 21. Further, a mixture of the melted adhesive and the melted water-stopping block 23 leaks out from the front end 16B of the electric wire covering portion 20 and solidifies to form the front leakage portion 24 (see FIG. 6).

After the melted adhesive and the melted water-stopping block 23 have solidified, the signal lines 14 and the power lines 13 are respectively covered with the corrugated tubes 35A and 35B.

As illustrated in FIG. 7, the multicore cable 10 to which the corrugated tubes 35A and 35B are attached is disposed in the lower case 25. Specifically, the sheath 15 is placed on the lower sheath holder 33 of the lower case 25. The corrugated tube 35B is placed on the lower corrugated tube holder 36, and the corrugated tube 35A is placed on the lower corrugated tube holder 40. In this state, the length dimension L1 of the sheath covering portion 19 is larger than the distance L2 between the front end 16B of the electric wire covering portion 20 and the stopper 42 in the front-rear direction. Note that as described above, the corrugated tubes 35A and 35B are omitted in FIG. 7.

The upper case 26 is attached to the lower case 25 from above, and the locking portions 31A, 31B and 31C and the lock receivers 32A, 32B and 32C are elastically engaged with each other. Thus, the sheath 15 is held by the protector 12 by being sandwiched between the lower sheath holder 33 and the upper sheath holder 34. Further, the corrugated tube 35A is held by the protector 12 by being sandwiched between the lower corrugated tube holder 40 and the upper corrugated tube holder 41, and the corrugated tube 35B is held by the protector 12 by being sandwiched between the lower corrugated tube holder 36 and the upper corrugated tube holder 38. As described above, the waterproof structure 11 of the multicore cable 10 is completed (see FIG. 1).

Operation and Effect of Embodiment

Next, operations and effects of the present embodiment will be described. The waterproof structure 11 of the multicore cable 10 includes: the multicore cable 10 in which the power lines 13 and the signal lines 14 are surrounded by the sheath 15 and the power lines 13 and the signal lines 14 are led out from an end of the sheath 15; the heat-shrinkable tube 18 having the sheath covering portion 19 that covers the sheath 15 and the electric wire covering portion 20 that is continuous with the sheath covering portion 19 and covers the power lines 13 and the signal lines 14 led out from the front end 16A of the sheath 15; the waterproof portion 22 that is disposed in the gap between the electric wire covering portion 20 and the power lines 13 and the signal lines 14 to prevent the water from entering the gap between the electric wire covering portion 20 and the power line 13 and the signal line 14; and the protector 12 that holds the heat-shrinkable tube 18 therein and has the stopper 42 located near the front end of the heat-shrinkable tube 18. The heat-shrinkable tube 18 has the length dimension L1 of the sheath covering portion 19 that is set larger than the distance L2 between the front end 16B of the electric wire covering portion 20 and the stopper 42.

As illustrated in FIG. 1, when the multicore cable 10 is assembled to the protector 12, the length dimension L1 of the sheath covering portion 19 is larger than the distance L2 between the front end 16B of the electric wire covering portion 20 and the stopper 42. Thereafter, when a current passes through the multicore cable 10 and the multicore cable 10 generates heat, the heat-shrinkable tube 18 may further shrink. At a temperature at which the heat-shrinkable tube 18 contracts, the waterproof portion 22 may also soften. Then, the heat-shrinkable tube 18 slides on a surface of the softened waterproof portion 22, and moves from the sheath 15 having a relatively large diameter dimension to a region in which the power lines 13 and the signal lines 14 having a smaller diameter dimension as a whole are exposed.

Figure 8:
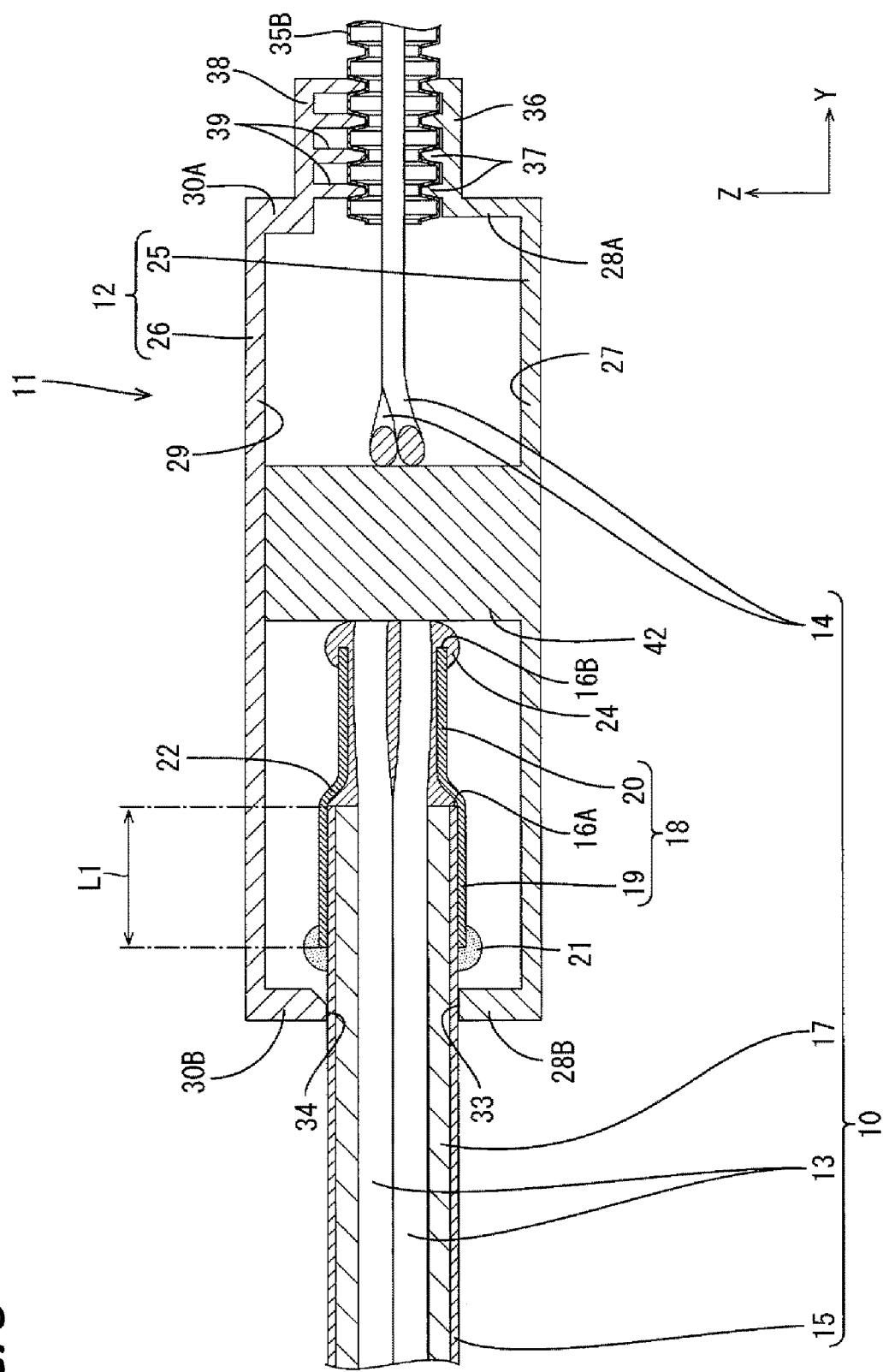
FIG. 8 is a cross-sectional view illustrating the waterproof structure of the multicore cable in a state in which the heat-shrinkable tube has been moved forward.

In the present embodiment, even if the heat-shrinkable tube 18 attempts to move in a direction in which the heat-shrinkable tube 18 is removed from the sheath 15 (forward, in the present embodiment) as the heat-shrinkable tube 18 receives heat and contracts, the heat-shrinkable tube 18 is supported by the stopper 42 (see FIG. 8). By the time the front end on the electric wire covering portion side of the heat-shrinkable tube 18 comes into contact with the stopper 42, the heat-shrinkable tube 18 moves by the distance L2 between the front end 16B of the electric wire covering portion 20 and the stopper 42 at a maximum. Since the length dimension L1 of the sheath covering portion 19 is set larger than the above-mentioned interval L2, at least a part of the sheath covering portion 19 is maintained so as to cover the sheath 15 while the front end 16B of the electric wire covering portion 20 of the heat-shrinkable tube 18 is supported by the stopper 42. Thus, the case where the heat-shrinkable tube 18 comes off from the end of the sheath 15 is suppressed, thereby suppressing the case where the waterproof portion 22 that is disposed between the electric wire covering portion 20 and the power lines 13 and the signal lines 14 becomes exposed. As a result, it is possible to suppress a reduction in the waterproof performance of the multicore cable 10.

Note that in the present embodiment, since the front leakage portion 24 is formed at the front end 16B of the electric wire covering portion 20, the front leakage portion 24 comes into contact with the stopper 42 from the rear. Thus, the case where the heat-shrinkable tube 18 moves forward is suppressed by the stopper 42 via the front leakage portion 24.

According to the present embodiment, the stopper 42 is located in front of the front end 16B of the electric wire covering portion 20 of the heat-shrinkable tube 18 in the direction from the sheath covering portion 19 to the electric wire covering portion 20.

According to the above configuration, when the heat-shrinkable tube 18 attempts to move in the direction in which the heat-shrinkable tube 18 is removed from the sheath 15, that is, in the direction from the sheath covering portion 19 to the electric wire covering portion 20, the stopper 42 reliably prevents the heat-shrinkable tube 18 from coming off. Thus, it is possible to reliably suppress a reduction in the waterproof performance of the multicore cable 10.

According to the present embodiment, the protector 12 has a sheath 15 holder for holding the sheath 15.

According to the above configuration, the sheath 15 holder of the protector 12 holds the sheath 15, so that the sheath 15 and the protector 12 are relatively positioned. Thus, since the sheath 15 and the stopper 42 of the protector 12 are relatively positioned, while the end on the electric wire covering portion 20 side of the heat-shrinkable tube 18 is supported by the stopper 42, the stopper 42 can be disposed so that the sheath 15 holder reliably covers the outer circumferential surface of the sheath 15. As a result, it is possible to suppress a reduction in the waterproof performance of the multicore cable 10.

According to the present embodiment, the power lines 13 led out from the sheath 15 are surrounded by the corrugated tube 35A, and the signal lines 14 are surrounded by the corrugated tube 35B. The corrugated tube 35A and the corrugated tube 35B are members different from the sheath 15. The protector 12 has the lower corrugated tube holder 40 and the upper corrugated tube holder 41 for holding the corrugated tube 35A, and also has the lower corrugated tube holder 36 and the upper corrugated tube holder 38 for holding the corrugated tube 35B.

According to the above configuration, the protector 12 and the corrugated tubes 35A and 35B can be relatively positioned. Thus, the heat-shrinkable tube 18, the power lines 13, and the signal lines 14 exposed from ends of the corrugated tubes 35A and 35B can be reliably covered with the protector 12. As a result, the heat-shrinkable tube 18, the power lines 13, and the signal lines 14 can be protected from collision with foreign objects by the protector 12, so that it is possible to further suppress a reduction in the waterproof performance of the multicore cable 10.

According to the present embodiment, the stopper 42 is provided at a position corresponding to the diameter portion of the front end 16B of the electric wire covering portion 20.

According to the above configuration, the stopper 42 can come into contact with a region corresponding to the diameter portion of the front end 16B of the electric wire covering portion 20, thereby reliably preventing the heat-shrinkable tube 18 from coming off. Thus, it is possible to reliably suppress a reduction in the waterproof performance of the multicore cable 10.

According to the present embodiment, the protector 12 has the power line guide portion 43 that comes into contact with the power lines 13 so as to guide the power lines 13 to the left, and also has the signal line guide portion 44 that comes into contact with the signal lines 14 so as to guide the signal lines forward.

According to the above configuration, since the power lines 13 and the signal lines 14 arranged inside the protector 12 are respectively guided by the power line guide portion 43 and the signal line guide portion 44, the case where their arrangement in the protector 12 shifts due to vibration is suppressed. Thus, it is possible to suppress the shifting of the relative positions of the power lines 13, the signal lines 14, and the waterproof portion 22, so that it is possible to further suppress a reduction in the waterproof performance of the multicore cable 10.

According to the present embodiment, the power line guide portion 43, the signal line guide portion 44, and the stopper 42 are integrally formed.

According to the above configuration, a structure of the protector 12 can be simplified as compared with the case where the power line guide portion 43, the signal line guide portion 44, and the stopper 42 are separate members.

According to the present embodiment, the waterproof portion 22 includes a hot melt resin.

According to the above configuration, a heating step for melting the water stopping block 23 including the hot melt resin and a heating step for shrinking the heat-shrinkable tube 18 can be performed in the same step, so that it is possible to increase the efficiency of a task for waterproofing the multicore cable 10.

Embodiment 2

Figure 9:
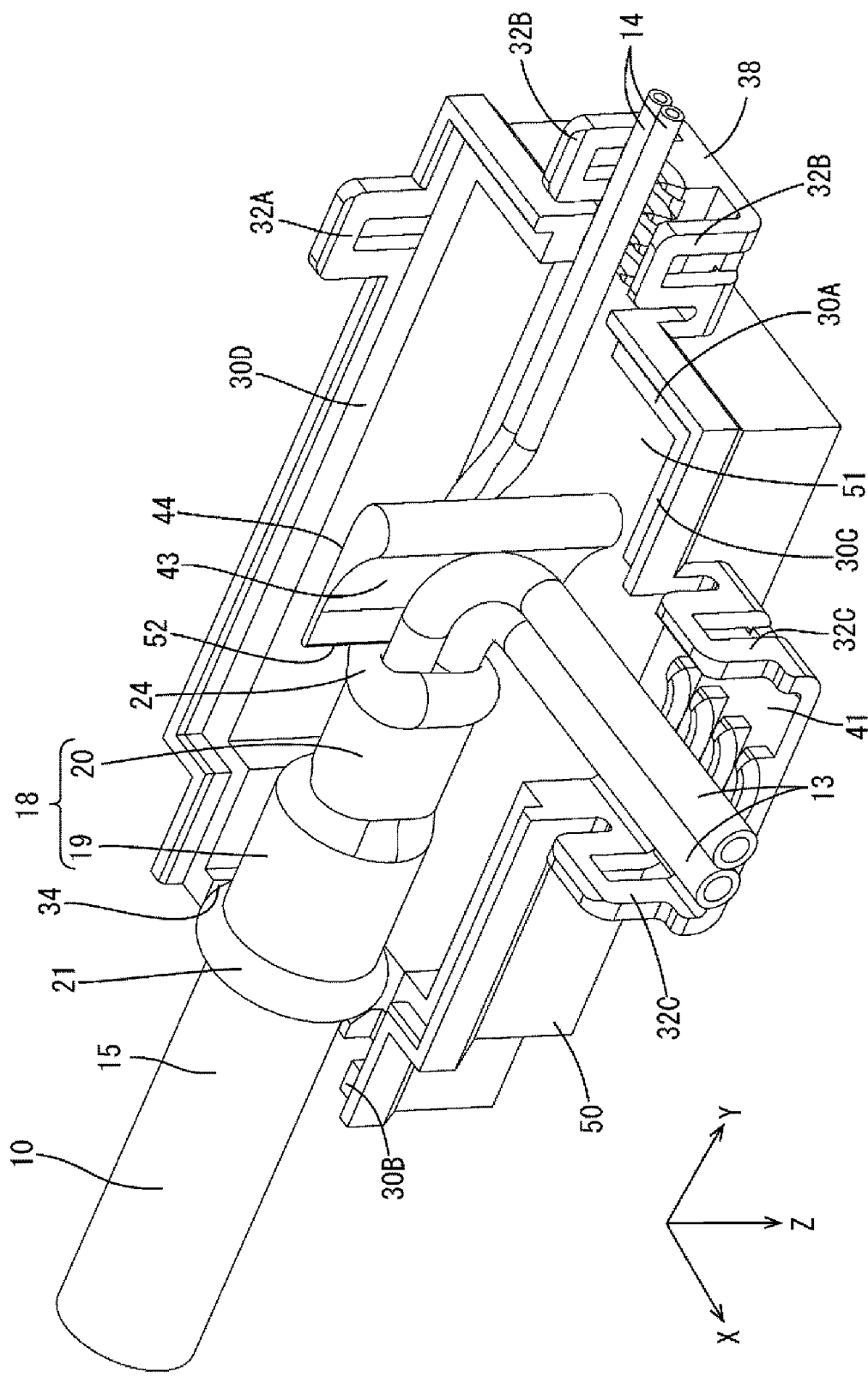
FIG. 9 is a perspective view illustrating an upper case and the multicore cable according to Embodiment 2.

Next, Embodiment 2 of the technique disclosed in this specification will be described with reference to FIG. 9. A stopper 52 extending downward is formed on an upper wall 51 of an upper case 50 according to the present embodiment. In the present embodiment, no stopper is formed on the bottom wall of the lower case (not shown).

Since components other than the above are substantially the same as those in Embodiment 1, the same members are denoted by the same reference numerals, and duplicate description thereof will be omitted.

Embodiment 3

Figure 10:
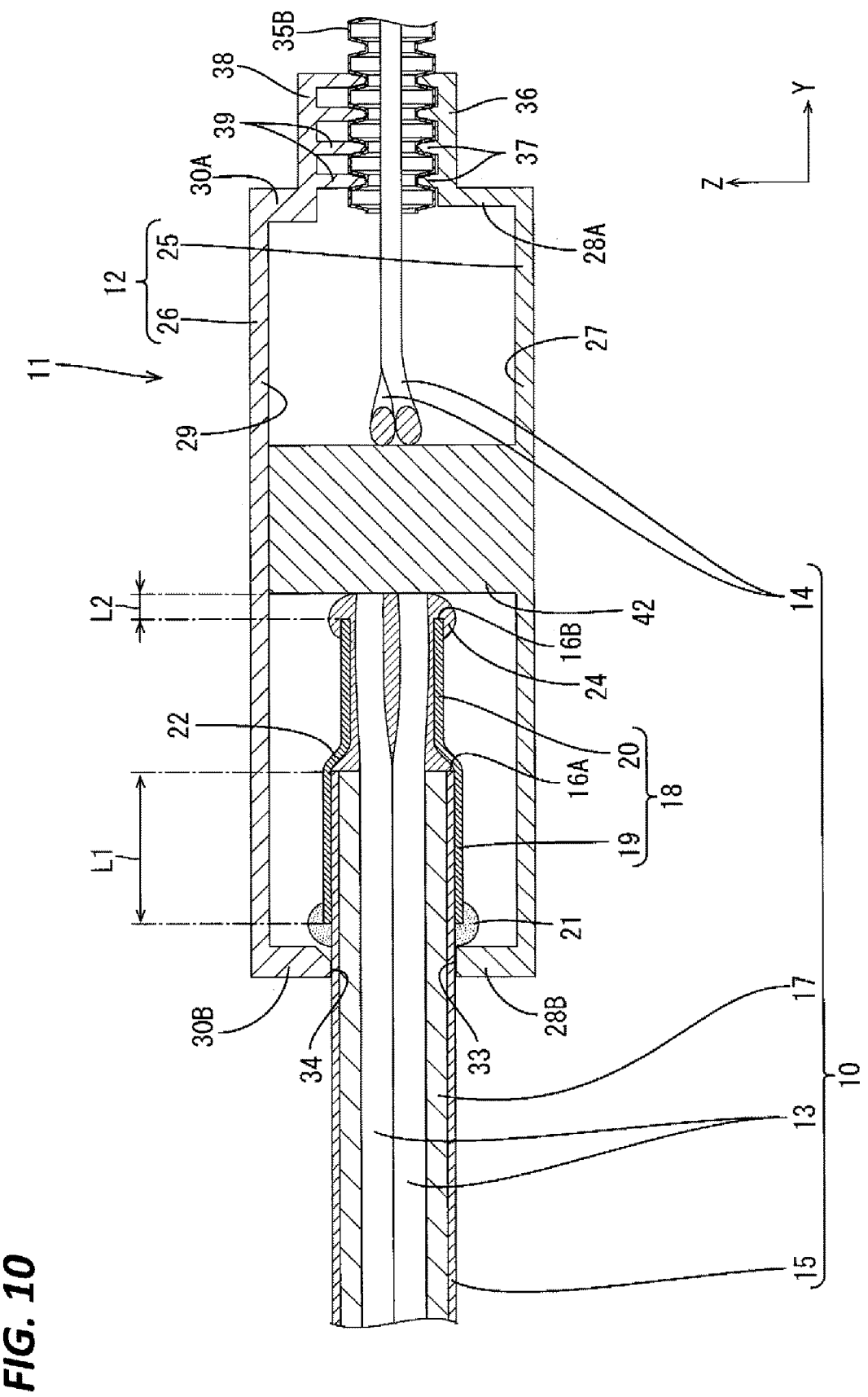
FIG. 10 is a cross-sectional view illustrating the waterproof structure of the multicore cable according to Embodiment 3.

Next, Embodiment 3 of the technique disclosed in this specification will be described with reference to FIG. 10. In the present embodiment, when an assembling step for assembling the waterproof structure 11 of the multicore cable 10 is completed, the front leakage portion 24 formed in the multicore cable 10 is in contact with the stopper 42 from the rear. Also in the present embodiment, the length dimension L1 of the sheath covering portion 19 is set larger than the distance L2 between the front end 16B of the electric wire covering portion 20 and the stopper 42 in the front-rear direction.

Since the components other than the above are substantially the same as those in Embodiment 1, the same members are denoted by the same reference numerals, and duplicate description thereof will be omitted.

According to the present embodiment, when the heat-shrinkable tube 18 attempts to move in the direction in which the heat-shrinkable tube 18 is removed from the sheath 15, that is, in the direction from the sheath covering portion 19 to the electric wire covering portion 20 (forward, in the present embodiment), the stopper 42 in contact with the front leakage portion 24 reliably prevents the heat-shrinkable tube 18 from coming off. Thus, it is possible to reliably suppress a reduction in the waterproof performance of the multicore cable 10.

Note that in the case where the front leakage portion 24 is not formed, the front end 16B of the electric wire covering portion 20 may be in direct contact with the stopper 42 from the rear.

OTHER EMBODIMENTS

The technique disclosed in this specification is not limited to the embodiments described in the above description and drawings, and for example, the following embodiments are also included in the technical scope of the technique disclosed in this specification.

(1) The number of electric wires included in the multicore cable 10 may be two, three, five or more. The diameter dimensions of the electric wires included in the multicore cable 10 may all be the same.

(2) The waterproof portion 22 may be formed by the melting and solidification of the adhesive applied to the inner surface of the heat-shrinkable tube 18.

(3) The exterior member for covering the electric wires led out from the sheath 15 is not limited to the corrugated tubes 35A and 35B, and any exterior member can be appropriately selected.

(4) The stopper 42 may be configured to come into contact with a region other than the diameter portion of the electric wire covering portion 20. Further, the electric wire covering portion 20 may be configured to be supported by a plurality of stoppers 42.

(5) The electric wire guide portion may be omitted. Further, the stopper and the electric wire guide portion may be separate members.

(6) The waterproof portion 22 may be a rubber stopper through which the power line 13 and the signal line 14 pass.

(7) A configuration is possible in which both or one of the front leakage portion 24 and the rear leakage portion 21 is not formed.

(8) A configuration is possible in which a stopper of a member different from the protector 12 is assembled to the protector 12.

(9) The shape of the stopper can be any shape as needed, such as a columnar shape, a square prism shape, or a triangular prism shape.

LIST OF REFERENCE NUMERALS

10 Multicore cable
11 Waterproof structure
12 Protector

13 Power line (Example of electric wire)
14 Signal line (Example of electric wire)
15 Sheath
16A Front end of sheath
16B Front end of electric wire covering portion
18 Heat-shrinkable tube
19 Sheath covering portion
20 Electric wire covering portion
22 Waterproof portion
33 Lower sheath holder
34 Upper sheath holder
35A, 35B Corrugated tube (Example of exterior member)
36, 40 Lower corrugated tube holder (Example of exterior member holder)
38, 41 Upper corrugated tube holder (Example of exterior member holder)
42, 52 Stopper
43 Power line guide portion (Example of electric wire guide portion)
44 Signal line guide portion (Example of electric wire guide portion)

What is claimed is:

1. A multicore cable waterproofing structure comprising:
a multicore cable in which a plurality of electric wires are surrounded by a sheath and the electric wires are led out from an end of the sheath;
a heat-shrinkable tube having a sheath covering portion that covers the sheath and an electric wire covering portion that is continuous with the sheath covering portion and covers the electric wires led out from the end of the sheath;
a waterproof portion that is disposed in a gap between the electric wire covering portion and the electric wires to prevent water from entering the gap between the electric wire covering portion and the electric wires; and
a protector that holds the heat-shrinkable tube therein and has a stopper located near an end on the electric wire covering portion side of the heat-shrinkable tube, wherein
in the heat-shrinkable tube, a length dimension $L1$ of the sheath covering portion is set larger than a distance $L2$ between the end on the electric wire covering portion side of the heat-shrinkable tube and the stopper.

2. The multicore cable waterproofing structure according to claim 1, wherein the stopper is located in front of the end on the electric wire covering portion side of the heat-shrinkable tube in a direction from the sheath covering portion to the electric wire covering portion.

3. The multicore cable waterproofing structure according to claim 1, wherein the protector has a sheath holder configured to hold the sheath.

4. The multicore cable waterproofing structure according to claim 1, wherein
the electric wires led out from the sheath are surrounded by an exterior member different from the sheath, and
the protector has an exterior member holder configured to hold the exterior member.

5. The multicore cable waterproofing structure according to claim 1, wherein the stopper is provided at a position corresponding to a diameter portion of the end of the electric wire covering portion.

6. The multicore cable waterproofing structure according to claim 1, wherein the protector has an electric wire guide portion that is in contact with at least one of the electric wires and guides the at least one electric wire.

7. The multicore cable waterproofing structure according to claim 6, wherein the electric wire guide portion and the stopper are integrally formed.

8. The multicore cable waterproofing structure according to claim 1, wherein the waterproof portion includes a hot melt resin.

* * * * *